(12) United States Patent
Pretini

(10) Patent No.: US 12,123,346 B2
(45) Date of Patent: Oct. 22, 2024

(54) METHOD FOR MONITORING AND CONTROLLING A HYBRID GAS TURBINE SYSTEM AND SYSTEM THEREOF

(71) Applicant: NUOVO PIGNONE TECNOLOGIE—S.R.L., Florence (IT)

(72) Inventor: Luca Pretini, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/003,631

(22) PCT Filed: Jun. 24, 2021

(86) PCT No.: PCT/EP2021/025231
§ 371 (c)(1),
(2) Date: Dec. 28, 2022

(87) PCT Pub. No.: WO2022/002436
PCT Pub. Date: Jan. 6, 2022

(65) Prior Publication Data
US 2023/0243302 A1  Aug. 3, 2023

(30) Foreign Application Priority Data

Jul. 2, 2020  (IT) .................. 102020000016009

(51) Int. Cl.
*F02C 6/00* (2006.01)
*F02C 9/00* (2006.01)
*F02C 9/28* (2006.01)

(52) U.S. Cl.
CPC .................. *F02C 6/00* (2013.01); *F02C 9/00* (2013.01); *F02C 9/28* (2013.01); *F05D 2220/76* (2013.01); *F05D 2270/20* (2013.01)

(58) Field of Classification Search
CPC .............................. F02C 9/28; F05D 2270/20
See application file for complete search history.

(56) References Cited

U.S. PATENT DOCUMENTS

| | | |
|---|---|---|
| 9,494,086 B2 | 11/2016 | Pandey et al. |
| 2015/0247464 A1 | 9/2015 | Pandey et al. |
| 2015/0345385 A1 | 12/2015 | Santini |
| 2016/0147204 A1 | 5/2016 | Wichmann et al. |
| 2016/0258361 A1 | 9/2016 | Tiwari et al. |

*Primary Examiner* — Scott J Walthour
(74) *Attorney, Agent, or Firm* — Paul Frank + Collins P.C.

(57) ABSTRACT

A method for monitoring and controlling a hybrid gas turbine system is disclosed, which is performed by a control logic unit. The method is implemented by executing an optimization among operating variables, so as to obtain control signals to control the operation of the hybrid gas turbine system. The hybrid gas turbine system is also disclosed, which includes at least one gas turbine, to be operated by fuel, and at least one electric motor/generator, capable of operating as a generator or as a motor. The hybrid gas turbine system comprises the control logic unit operatively connected to the fuel controller module and to the electric motor/generator controller.

14 Claims, 6 Drawing Sheets

METHOD FOR MONITORING AND CONTROLLING A HYBRID GAS TURBINE SYSTEM AND SYSTEM THEREOF

TECHNICAL FIELD

The present disclosure concerns improvements to a method for controlling a hybrid gas turbine systems used in mechanical drive applications, capable of increasing the efficiency during the operations. In particular, but not exclusively, the disclosure concerns a hybrid gas turbine system for driving a load, e.g., compressors for refrigerant fluids in liquefied natural gas facilities, compressors for compressing gas in pipeline transportation, a pump or any other rotary machine.

The invention also relates to the monitoring and control system that makes it possible to implement the method.

BACKGROUND ART

Currently the synergy between the gas turbine and an electric motor/generator, namely the so-called electrical reversible machines (which can also operate as a generator), such as a variable frequency drive electric motors (VFD electric motors) is now a driving design trend in the field of the systems aimed at driving mechanical loads.

In particular, there are available in the market systems, called "trains", "train systems" or similar, where an electric machine, or more specifically an electric motor/generator, is coupled with a gas turbine, to drive a load, such as one or more compressors or pumps. Hereafter, for ease of reference only, a system comprising a gas turbine, an electric motor/generator, and a load, e.g. a compressor, usually connected to the electric motor/generator by a clutch or a disconnecting device in general may be referred to as a "train", a "train system" or a "train plant". As used herein, a system comprising a gas turbine coupled with an electric motor/generator may be referred to as "a hybrid gas turbine system" or a "hybrid gas turbine train".

Electric motor/generators may be used to supplement mechanical power to a load, thereby keeping the overall mechanical power on the load shaft constant when power availability of the turbine decreases, and/or to increase the total mechanical power used to drive the load. This function of the electric motor/generator is referred to as "helper duty". Another electric motor or, alternatively a pneumatic motor/generator, is usually used also as a starter motor, to accelerate the gas turbine from zero to the rated speed.

Examples of hybrid gas turbine systems designed to drive mechanical loads are those applied to Liquefied Natural Gas (LNG) applications. LNG results from a liquefaction process, in which the natural gas is cooled using one or more refrigeration cycles in a cascade arrangement, until it becomes liquid. Natural gas is often liquefied for storage or transportation purposes, especially when pipeline transportation is not possible. Cooling of the natural gas is performed using closed or opened refrigeration cycles. A refrigerant is processed in a compressor or compressors, condensed and expanded. The expanded, chilled refrigerant is used to remove heat from the natural gas flowing in a heat exchanger.

Some layouts of train systems are known in the field. One of the most common includes a gas turbine connected to one or more cascade-connected compressors, with the latter compressor of the cascade mechanically connected to an electric motor/generator; or, as an alternative, a gas turbine connected to an electric motor/generator, which is then connected to a compressor.

The management of train systems turns out to be very complicated, because there are several variables that must be considered and balanced to operate the same. Currently available plants, which, as said, are very sophisticated, have a number of sensor and actuators connected to the control computer systems, whereby the operation of the train system is controlled and properly managed.

However, modern power generation plants have to fulfill a number of constraints, not only of technical type. In particular, from the ambient standpoint, it is usually requested to reduce the emission of $CO$, $CO_2$, and $NO_x$, $SO_x$ which depends on the type of gas turbine operating and increases almost linearly with the power generated by the gas turbine. Emission control requires the management of several parameters that can vary depending on the ambient temperature, the humidity degree, fuel composition and other parameters, usually not easy to control all together by an operator.

In addition, it is usually required that the maintenance of a train system is programmed in order to increase their life extension. However, to increase the life extension of a train systems, operation management needs to be carried out in accordance to its specific use. In other words, depending on the ambient and the usual operation conditions, the maintenance plan of the train system can change remarkably.

In addition, and in connection to the above, it is usually requested to minimize the capital expenditures and the operating expenditures connected to the operations of any hybrid gas turbine system or train system, and therefore to maximize the profit obtainable out of any plant, always at the same time minimizing the gas turbine emissions or, in some circumstances, keep them below certain thresholds, often set by the law. This implies that a high specialized operators are required to manage and control such kind of systems or plants. In particular, this requires a high level of education and a deep knowledge of the systems to control and manage by the operators.

It is known that modern plants are provided with a large number of sensors and actuators for operating the same by computer systems properly programmed. However, sometimes such computer systems are not able to control hybrid gas turbine systems for optimal operation, which facilitates increasing profits. Also, a typical operator may not have all the technical and business skills needed to evaluate the right balances and trade-offs between the power supply sharing between operating the gas turbine (which consumes fuel) and operating the electric motor/generator (which either consumes or produces) electric power, especially in case of multi-unit plants, as described above.

Thus, there is an increasing demand for hybrid gas turbine systems or train systems capable of optimizing the operations, taking also into account emissions and several other parameters not only necessarily physical, so as to maximize the profit and the efficiency of a hybrid gas turbine.

SUMMARY

In one aspect, the subject matter disclosed herein is directed to a method for monitoring and controlling a hybrid gas turbine system. The hybrid gas turbine system includes at least one gas turbine, to be operated by fuel, at least one electric motor/generator, capable of operating as a generator or as a motor, and a plurality of actuators for their control. The method is implemented by a control logic unit. The method includes the following steps: receiving a set of operating variables x, for detecting the operating states of the gas turbine, and of the electric motor/generator; receiving a set of external variables w; selecting a set of control variables u, for controlling the operating states of the gas turbine and of the electric motor/generator; setting a set of optimizing variables y, wherein the values of the optimizing variables y depend on the operating variables x, the control variables u, and the external variables w. The values of the optimizing variables y have to be adjusted for being optimized. Also the method comprises the steps of processing one or more of the operating variables x, the control variables u, and the external variables w, by optimizing the values of the optimizing variables y, and generating and transmitting one or more control signals based on the control variables u as obtained by the optimization of the optimizing variables y, to control the actuators of the hybrid gas turbine system.

In one aspect, the one or more control signals allow the control of the fuel supplying the gas turbine, and the power generated or transformed by the electric motor/generator.

In another aspect, disclosed herein is a gas turbine comprising a fuel controller module, operatively connected to a control logic unit. The electric motor/generator comprises an electric motor/generator controller, operatively connected to the control logic unit. The control logic unit is configured to transmit the control signals generated in the generating step to the fuel controller module and to the electric motor/generator controller to control the operation of the gas turbine, and the operation of the electric motor/generator.

In another aspect, the control logic unit is connected to an energy source or a power plant. Examples of types of power plants may include: a grid energy storage plant, a solar panel power plant, a wind power plant, a hydrothermal power plant, and a thermal power plant.

In an aspect, the gas turbine is connected to a load, such as a pump or a compressor. Also, the gas turbine is connected to the load through a disconnecting device, like a self-synchronizing clutch or an over running. The disconnection or connection made by the disconnecting device may be operated manually by an operator and/or automatically by an actuator.

In one aspect, the subject matter disclosed herein is directed to a hybrid gas turbine system, at least one gas turbine, to be operated by fuel, comprising a fuel controller module, operable to control the fuel to be supplied to the gas turbine. The hybrid gas turbine system also comprises at least one electric motor/generator, capable of operating as a generator or as a motor, comprising an electric motor/generator controller, adapted to control and adjust the electric power generated or transformed by the electric motor/generator, and a control logic unit, operatively connected to the fuel controller module, and to the electric motor/generator controller.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Turbomachinery equipment, such as gas turbines, electric motors/generators, and compressors/pumps may be coupled together in various configurations called, within the field, "trains" or "train systems". The operation of a train system requires the control of a large number of physical parameters, which also depend on ambient parameters, such as: ambient temperature and the humidity, equipment age, losses at inlet/outlet, combustion dynamics, and more. In addition, emissions of the gas turbines may need to be optimized to satisfy laws, rules or regulations of the country where the train system is installed and operated. Finally, to increase the profit obtainable from a plant, capital expenditures, maintenance expenditures, and operating expenditures have to be kept as low as possible. Managing this load of data and constraints turns out to be complicated and thus a new computer-based optimization method for accomplishing all the requests above is turbomachinery equipment and/or accessories within a train system itself is/are operated and/or maintained.

Figure 1:
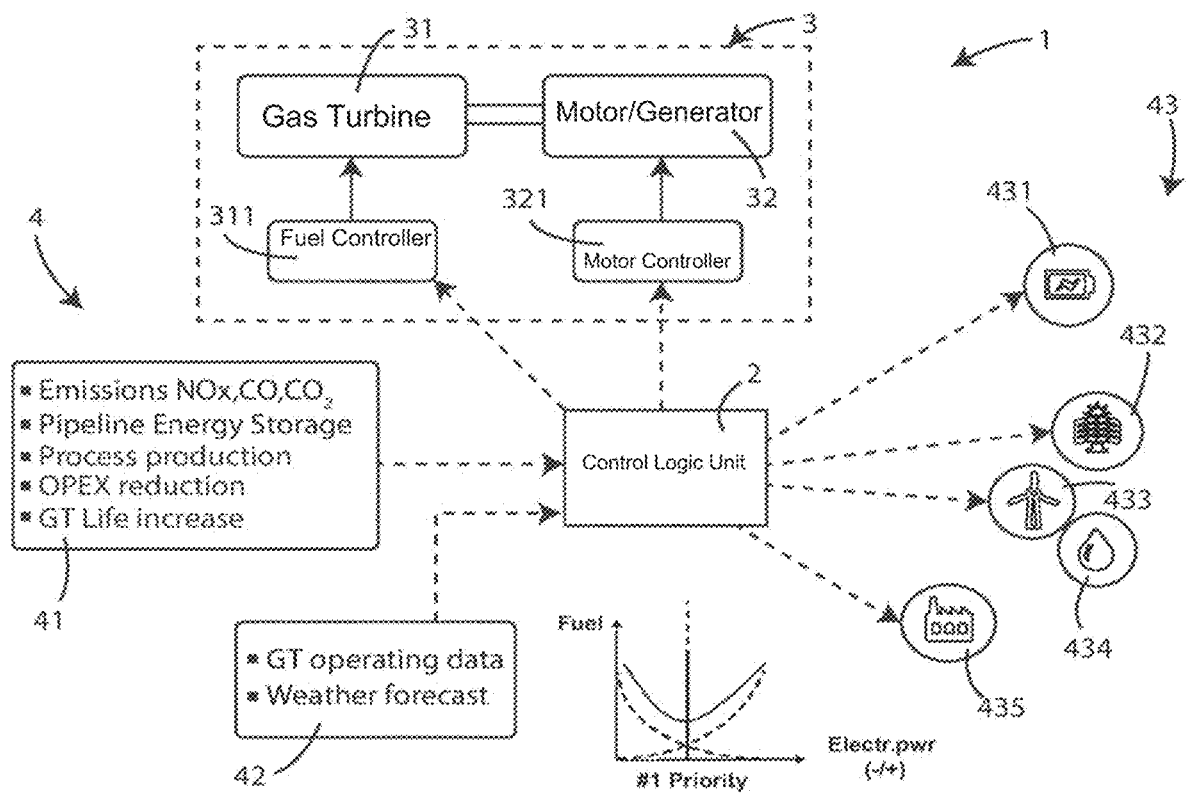
FIG. 1 illustrates a block diagram of an embodiment of a system for monitoring and controlling a hybrid gas turbine system.

Referring to FIG. 1, it is illustrated schematically a managing and controlling hybrid gas turbine system, wholly indicated by the reference number 1, that includes, in general, a control logic unit 2, a hybrid gas turbine 3, comprising, in its turn, a gas turbine 31, and an electric motor/generator 32, both operatively connected to the control logic unit 2 through a fuel controller module 311, and an electric motor/generator controller 321, respectively. The control logic unit 2 is configured to control the operation of the hybrid gas turbine 3, as better explained below, fulfilling constraints and optimizing the use of the resources, namely the fuel of the gas turbine 31 and the power absorbed or supplied by the electric motor/generator 32.

The control logic unit 2 can be realized in different ways. In particular, in some embodiments (see also below) the control logic unit 2 is fully embodied in a circuit board, directly installed in the managing and controlling hybrid gas turbine system, with previously installed processing components, such as a microprocessor, a PLC, and the like, which are properly programmed, so as to carry out the management and control operation. In other embodiments, the control logic unit 2 can be at least in part realized as a software, remotely run with respect to the managing and controlling hybrid gas turbine system. In particular, in this case, the control logic unit 2 can be a common personal computer or a terminal in general, which is programmed to interface with the hybrid gas turbine system, receiving instruction from another, possibly remote with respect to it.

More specifically, the control logic unit 2 is configured to receive data from several sources 4, and therefore as much types of variables and data, used as input of the monitoring and controlling method, based on an optimization algorithm. This is aimed at allowing the gas turbine 31 to run always preferably at 100%, thus maximizing the capex, adding revenues stream and reducing $CO_2$ and $No_x$ emission in complete automatic mode based on process condition and financial inputs. The managing and controlling hybrid gas turbine system 1 also operates in predictive mode, i.e. whether forecast for renewable availability and energy storage using pipeline as vessel, trading of electric energy or fuel. The control will act in dynamic mode, so that the maximization is kept always at the best possible level.

A first group of data or variables 41 comprises operator's target rankings, that in general includes constraints regarding the emission of CO, $CO_2$, and $NO_x$, the pipeline energy storage, which comprises the capability of a pipeline to store energy for example in a pipeline management, and process production, operating expenditures, and requirements to increase the life of the gas turbine 31. These data are usually received from the operator.

A second group of data or variables 42 can comprise gas turbine operating data and weather forecasts. It is known, in fact, that the weather affect considerably the operation of a gas turbine.

Figure 2:
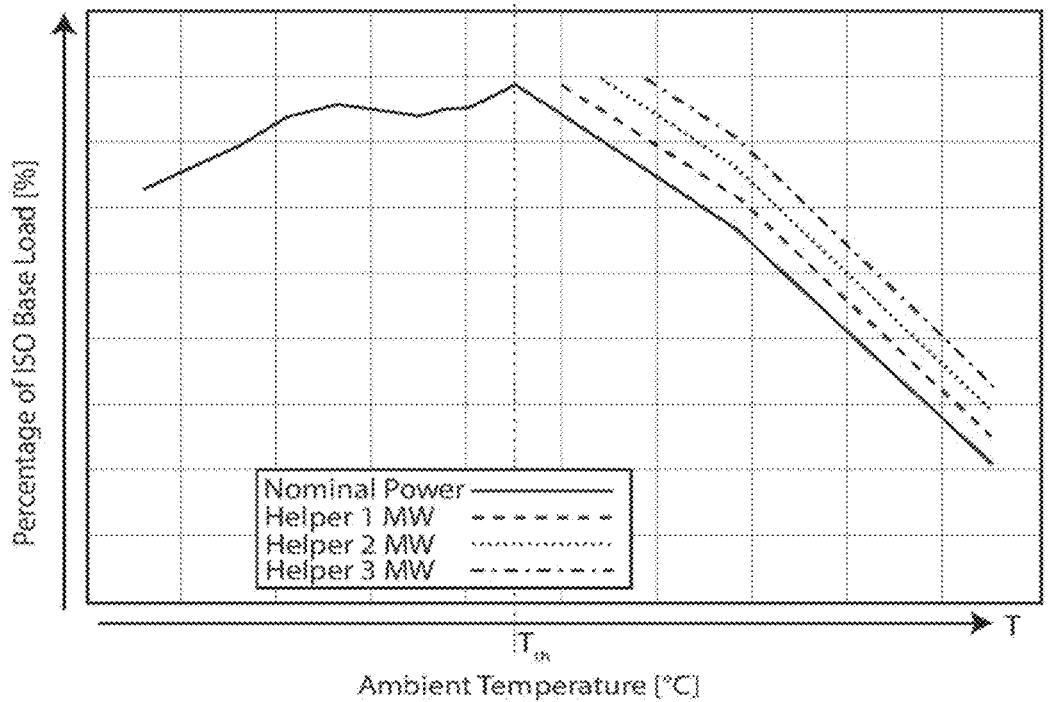
FIG. 2 illustrates a graph showing a graph of the percentage of operation of ISO base load of a gas turbine as a function of the ambient temperature.
Figure 3:
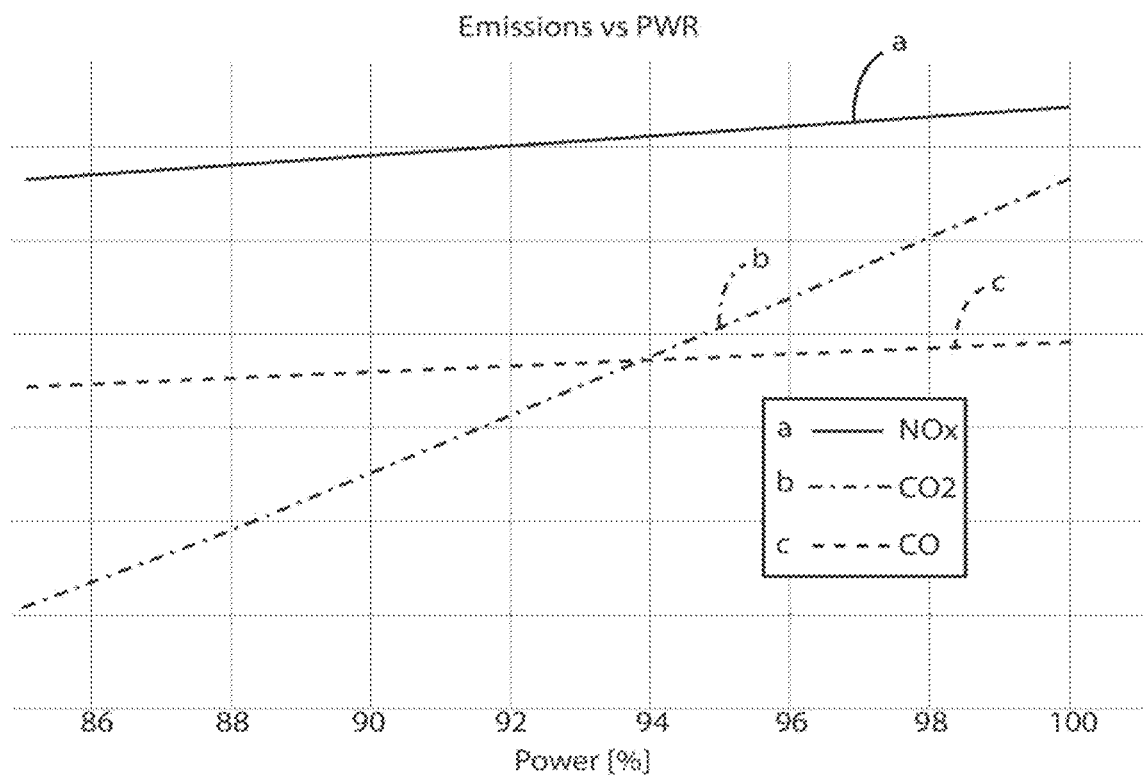
FIG. 3 illustrates a graph of the emission of and $NO_x$, $CO$, and $CO_2$ as a function of the power percentage of a gas turbine.

Just by way of example, FIG. 2 shows the percentage of operation of ISO base load of the gas turbine 31, as a function of the ambient temperature. As it can be easily appreciated, over a certain threshold temperature $T_{th}$ the power generated by the gas turbine 31 decreases remarkably with the increasing ambient temperature T. This happens regardless the electric motor/generator 32 operates as helper or not. In fact, the operation of the electric motor/generator 32 as helper has the only effect to shift the threshold temperature $T_{th}$ toward a higher temperature (namely on the right of the abscissa of the graph). Referring also to FIG. 3, it can be seen that the emission of and $NO_x$ (curve a), CO (curve b), and $CO_2$ (curve c) increases, with different rates, with respect to the power supplied by the gas turbine 31 (expresses as percentage of the total power). Therefore, combining the information obtainable from the two graphs of FIGS. 2 and 3 it is easy to infer that the an increase of the ambient temperature T causes a reduction of the performances of the gas turbine 31, and, therefore, this causes, in its turn, the emissions of CO, $CO_2$, and $NO_x$.

Still referring to FIG. 1, a third group of data 43 can come from one or more energy sources or power plants the hybrid gas turbine system 3 is connected to, such as, by way of example, a grid energy storage 431, a solar panel power plant 432, a wind power plant 433, a hydrothermal power plant 434, and a thermal power plant 435. These data concern in particular the demand and the power supply capabilities of the different plants. In the following the data considered will be better discussed.

The gas turbine 31 can be of different types, such as, by way of example and not limitation: a heavy duty, gas turbine, or aeroderivative gas turbine. In a case where different types of gas turbines 31 are installed, the related control variables or parameters may change. However, the installation of different gas turbines 31 or the other possible hybrid architecture, as better specified below, would not change the scope of protection of the solution herein disclosed.

The electric motor/generator 32 can be also of different type. In particular, a type of electric motor/generator 32 is the variable frequency drive electric motor (VFD electric motor) 32, which is very often used in the field in combination with gas turbines 31 for several functions, and in particular as a generator or motor, as better explained in the following. The use of this type of electric motor/generator 32 is often motivated by the fact that it is particularly useful for electrical control.

Figure 4:
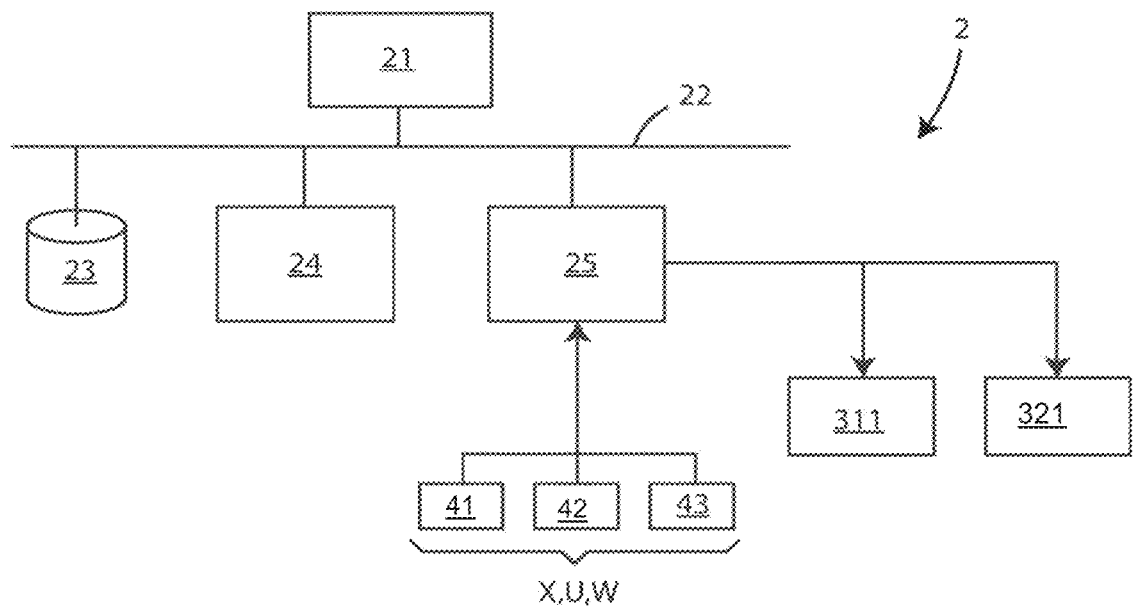
FIG. 4 illustrates a block diagram of an embodiment of a control logic unit of the system for monitoring and controlling a hybrid gas turbine system.

In some embodiments, and particularly referring to FIG. 4, the control logic unit 2 may include: a processor 21, a bus 22, to which the processor 21 is connected to, a database 23, connected to the bus 22, so as to be accessed and controlled by the processor 21, a computer-readable memory 24, also connected to the bus 22, so as to be accessed and controlled by the processor 21, a receiving-transmitting module 25, connected to the bus 22, configured to transmit control signals to the fuel controller module 311 of the gas turbine 31, and to the an electric motor/generator controller 321 of the electric motor/generator 32, to control the operations of the hybrid gas turbine system 3, in the different operation modes available. In fact, the monitoring and controlling method herein described controls the gas turbine 31 and the electric motor/generator 32 for optimizing the operation of the hybrid gas turbine system 3. Through the appropriate "modulation" of command signals processed by the processor 21 running one or more computer programs sent to the fuel controller module 311, and to the electric motor/generator controller 321 the optimization of the hybrid gas turbine system 3 is achieved. More specifically, the fuel controller module 311 and the electric motor/generator controller 321 respectively control the actuators of the gas turbine 31, and the electric motor/generator 32, to select the operating patterns for their operation. In this embodiment, the control logic unit is installed close to the train system.

The control logic unit 2 is configured to execute one or more computer programs for carrying out an optimization method or algorithm aimed at controlling the hybrid gas turbine system 3. In some embodiments the control logic unit 2 can be a physical hardware, possibly installed close to the hybrid gas turbine 3 installation, or remotely arranged. In some embodiments, the control logic unit 2 can also be based or run in a cloud. In this embodiment, it is required only the part of the control logic unit 2 that transmits the control signal is required to be installed close to the train system, while a data processing part can be located remote with respect to the train system, and, as mentioned, in a cloud-based system or near or at the location where the control room (or computer/server/terminals) is located, wherein the control room/computer/server is coupled via wire or wireless means to the train system or the control signal transmission part.

The controlling and managing method, based on an optimization algorithm, one embodiment of which is better explained below, has, as input, the data and variables coming from the sources 4, namely the first 41, the second 42, and the third 43 groups of data and variables. These groups of data 41, 42, and 43 are then organized, for example, in three sets or vectors, in order to be processed. The controlling and managing method can process all the data and the variables or a part of them, so that the method can be flexible. In this way, the same algorithm, based on which the controlling and managing method is based, can be used for optimizing a subset of data or for adapting to different layouts of hybrid gas turbine systems. This is done, as better explained below, by setting at zero or at one (or, in general, at a value difference from zero) a set of weighting parameters, used for selecting or not one or more parameters or variables.

The monitoring and controlling optimization method/algorithm, is based on a set of equations for a multivariate regression analysis in a multi-objective optimization problem. The algorithm can me synthetized with the following set of equations $$\min_{u} [f_1(x, u, w), f_2(x, u, w), \ldots, f_k(x, u, w)]$$

s.t.

$$x_{min} \geq x \geq x_{max}$$

$$u_{min} \geq u \geq u_{max}$$

where $x \in \mathbb{R}^b :=$ state vector $u \in \mathbb{R}^m :=$ control variables vector $w \in \mathbb{R}^q :=$ external parameters vector In particular, there are three different variables vectors, where the control functions $f_k(x, u, w)$ represent relation between the different variables of the model, as better explained below.

The variable vector x comprises state variables and can contain both measured values (instruments) and calculated values (through tables and/or known functions) or estimated values (through estimators). Such state variable vector x describe the operating state of the gas turbine 31 and of the electric motor/generator 32. In the following, an example of the state variables x organized as a vector is provided, taking in consideration that different variables or additional variables can be considered $$x = \begin{bmatrix} \text{ambient pressure} \\ \text{ambient temperature} \\ \text{ambient humidity} \\ \text{turbine inlet temperature} \\ \text{turbine inlet pressure} \\ \text{turbine compressor discharge temperature} \\ \text{turbine compressor discharge pressure} \\ \text{turbine compressor air flow} \\ \text{fuel temperature} \\ \text{fuel composition} \\ \text{combustion mode} \\ \text{high power turbine speed} \\ \text{first nozzle temperature} \\ \text{high power turbine discharge temperature} \\ \text{high power turbine discharge pressure} \\ \text{high power turbine flow} \\ \text{boost turbine speed} \\ \text{boost turbine discharge temperature} \\ \text{boost turbine flow} \\ \text{low power turbine speed} \\ \text{low power turbine discharge temperature} \\ \text{low power turbine flow} \\ \text{driven compressor inlet pressure} \\ \text{driven compressor inlet temperature} \\ \text{driven compressor inlet flow} \\ \text{driven compressor outlet temperature} \\ \text{driven compressor outlet pressure} \\ \text{electric motor power} \\ \text{emissions} \\ \text{life} \\ \text{clutch feedback} \\ \vdots \end{bmatrix}$$

Another vector u comprises control variables, which are the outputs of the control logic unit 2 for driving the fuel controller module 311, and the electric motor/generator controller 321. An example of control variable u, arranged as a column vector, is reported below $$u = \begin{bmatrix} \text{fuel demand} \\ \text{inlet guide vanes demand} \\ \text{variable stator vanes demand} \\ \text{variable bleed vanes demand} \\ \text{bleed valve demand} \\ \text{over} - \text{board bleed vanes demand} \\ \text{axial antisurge valve demand} \\ \text{nozzle guide vanes} \\ \text{centrifugal antisurge valve demand} \\ \text{compressor inlet vanes demand} \\ \text{motor setpoint} \\ \text{reactive power setpoint} \\ \vdots \end{bmatrix}$$

The third variable vector w comprises external variables or data or parameters, which can include also economic parameters and constraints such as the fuel cost or the taxes to be charged for operating the system. The control data or variables w includes actually data and constraints normally set either by the operator or by an external agent. An example of external variables is reported in the following vector $$w = \begin{bmatrix} \text{fuel cost} \\ \text{electric energy selling price} \\ \text{electric energy cost} \\ \text{emissions tax} \\ \text{mainteneance cost} \\ \text{additional energy availability} \\ \vdots \end{bmatrix}$$

The variables processed by the method for monitoring and controlling a hybrid gas turbine system is designed to process three sets of variables, namely the above-mentioned state variables x, control variables u, and external variables w. It is clear that all the variables capable of characterizing the operation of the hybrid gas turbine 3 or, in general, the train system wherein the hybrid gas turbine system 3 is provided, can include additional variables or grouping thereof. The method for controlling a hybrid gas turbine system 3 operates a set of optimization variables $y_i$ to be optimized. These optimization or target variables $y_i$ can be different of the state variables x, control variables u, and external variables w, or even a subset thereof. The optimization variables $y_i$ can also be organized in column vector.

Each of the optimization variables $y_i$ is expressed through a specific operating function $f_i(x, u, w)$, whereby it is expressed the dependency, which can be also non-linear. Then, the optimized value of the state variables x, control variables u, and external variables w is calculated minimizing the norm $\|y_i - f_i(x, u, w)\|$ for each optimization variable $y_i$ as following $$\min_{u} \alpha_1 \cdot \|y_1 - f_1(x, u, w)\| +$$
$$\alpha_2 \cdot \|y_2 - f_2(x, u, w)\| + \ldots + \alpha_k \cdot \|y_k - f_k(x, u, w)\| \text{ where}$$

$y_i \in \mathbb{R}^{p_i} :=$ optimization variables vector and $\alpha_i \in \mathbb{R}^{p_i} :=$ weight vector $$\sum_i^k \alpha_i = 1.$$

As it can be seen, the optimization method minimizes the equation above through the application also of a weight vector $\alpha_1$ for each summed factor $\|y_i - f_i(x, u, w)\|$.

The optimization variables $y_i$ have in common the same measure, namely they should be in principle measured by the same metrics. For instance, in some embodiment the optimization variables $y_i$ can be the capex costs of the plant, so that they should be measured in US$. In other embodiments, the optimization variables $y_i$ can be the power consumption of the plant, in which case the variables should be measured in MW. By way of example, if the algorithm is aimed at minimizing the total exercise cost of the plant, each of the parameters $y_i$ would represent the cost of the operation of the plant, such as the fuel cost, the maintenance, the cost of the fines in case of excess of emissions, and so on. As another example, a possible optimization variable $y_i$ of a set can be the torque/speed ratio of the electric motor/generator 32, which is a known parameters of any electrical machine.

As mentioned, each of the control functions $f_i(x, u, w)$ expresses the relation between each of the parameters $y_i$ and the state variables x, the control variables u, and the external parameters w. For example the cost of the fuel, e.g. expressed in US$, would be function of the type of operation selected (use of the electric motor/generator 32 as starter/helper mode, generator mode, etc.), the power generated by the electric motor/generator 32, the current cost of the fuel and the fuel consumption by the gas turbine 31 as a function of the environmental temperature and humidity. As it is clear, the cost of the fuel, although expressed in terms of a currency, namely US$, likewise, preferably, all the other parameters of the optimization variables $y_i$, is a function of several other parameters and variables, both technical (necessarily), and non-technical.

The model, at the end of the optimization process, find the most appropriate set of values for the control variables u, which include usually technical variables, to drive, at the end of the process, the fuel controller module 311, and the electric motor/generator controller 321, obtaining the required optimized adjustment.

As mentioned, the control functions $f_i(x, u, w)$ are usually non-linear functions and can vary, for example, from gas turbine and gas turbine, as well as from electric motor/generator and electric motor/generator. Just to stick with one of the examples above, the cost of the fuel employed is a function of the power generated by the gas turbine 31 of the hybrid gas turbine 3, which is a specific function of the machine.

The control functions $f_i(x, u, w)$ can also include combinations of Heaviside functions, here below expressed in general terms $$\Theta(\zeta) = \begin{cases} 0, \zeta < 0 \\ 1, \zeta \geq 0 \end{cases}$$

in order to express possible thresholds, namely constraints (or limits) of the model. For instance, it could be requested to optimize a single optimization variable y (thus i=1), which can be the fuel consumption, setting a maximum threshold $F_{Max}$. In this case, the function expressing the y in terms of the state variables x, the external variables u, and the external parameters w $$y = f(x, u, w)$$

would take the form $$y = f(x, u, w) \cdot (1 - \Theta(F_{Max})).$$

The weight parameters $\alpha_i$ are applied to set relative weights among the different optimization variables $y_i$. In this way, the algorithm underlying the monitoring and controlling method can be flexible. In case of one or more parameters of the weight $\alpha_i$ is set to zero, the corresponding optimization variable $y_i$ would be excluded by the optimization process. This also allows to simplify the algorithm, adapting the same to a subset of variables received or available, or even to adapt the same algorithm, and therefore the monitoring and controlling method, to a different hybrid gas turbine system 3, may be having a different layout.

Also, when all the optimization variables $y_i$ are considered, the normalization $$\sum_i^k \alpha_i = 1$$

can take place. Of course the normalization above can change depending on the model and the optimization variables $y_i$.

Also, in practice, subsets of the weight parameters $\alpha_i$ is preset or selected, in order to drive the optimization method 5 for monitoring and controlling a hybrid gas turbine system according to specific patterns, to achieve certain results, such as maximize the power to be generated, maximize the life of the gas turbine 31, minimize the emissions, and so on.

Once the optimization is achieved, and the following expression is minimized $$\min_{u} \alpha_1 \cdot \|y_1 - f_1(x, u, w)\| + \ldots + \alpha_k \cdot \|y_k - f_k(x, u, w)\|$$

the values of the state variables x, the control variables u, and the external parameters w is obtained and the logic control unit 2 can send one or more command signals to the fuel controller module 311, and to the electric motor/generator controller 321, so as to control their operation and select the hybrid gas turbine system 3, tuning, in particular, the fuel consumption of the gas turbine 31, and the power generated by the electric motor/generator 32, while operating as a motor, and therefore the power supplied by the electric motor/generator 32 helps the gas turbine 31, or as a generator, and therefore the power generated is injected for example in the electric grid (not shown in the figures).

The operation of the controlling and monitoring method, as well as of the gas turbine system 1 is as follows.

As mentioned above, once the control logic unit 2 receives the data from the several sources 4, which it is connected to, the data (or variables) are organized in subsets. In particular, for ease of description, they are organized according to tree sets or vectors above-mentioned, namely the state variables x, the control variables u, and the external variables w, which are then processed by the processor 21. It is clear that the division of the variables according to the above three sets or vector is only formal, and a different grouping can be arranged (or no grouping at all). The processor 21, in particular, retrieves in the embodiment disclosed in FIG. 4, the computer program to be processed memorized in the computer-readable memory 24, to process the data received. Subsequently, the data are processed on the basis of an optimization algorithm, of which an embodiment has been disclosed above, so as to find an optimization of the control the gas turbine 31, and the electric motor/generator 32.

Figure 5:
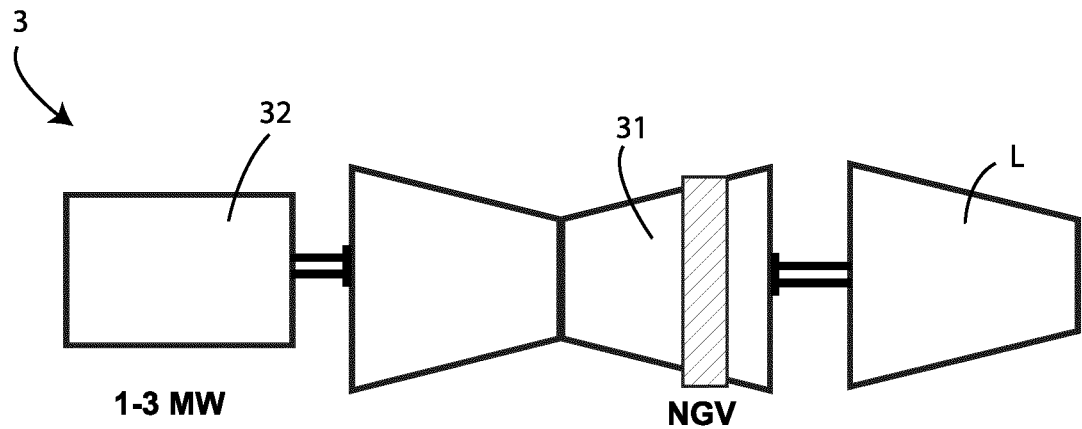
FIG. 5 illustrates a first embodiment of a train system

Of course, also the optimization algorithm and then the method for controlling the hybrid gas turbine system 3 has to adapt depending on the operation mode the hybrid gas turbine system 3 has to operate under the specific circumstances, as well as depending on the layout of the train system the hybrid gas turbine system 3 to be controlled is installed in. In order to better explain this points, reference is made to FIG. 5, which illustrates an embodiment of hybrid gas turbine 3, comprising a variable frequency drive electric motor (VFD electric motor) 32, as electric motor/generator, and a gas turbine 31, connected downstream the VFD electric motor 32. The load L is connected to the gas turbine 31. The VFD electric motor 32 is capable of generating an electric power of 1-3 MW. It is intended that the VFD electric motor 32 can be of different type, and capable of generating different power. The VFD electric motor 32 is usually implemented in the field since it turns out to be particularly easy to manage and control electrically. The gas turbine 31 is designed to generate a power supply of 30 MW. Also in this case, the gas turbine 31 is exemplary and different type of gas turbines 31 can be provided.

Figure 6:
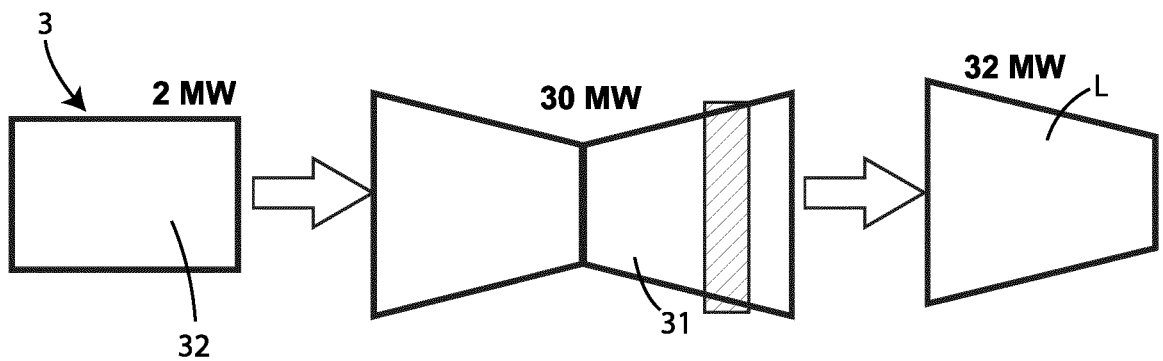
FIG. 6 illustrates a scheme of the operation of the train system of FIG. 5 in the starter/helper mode.
Figure 7:
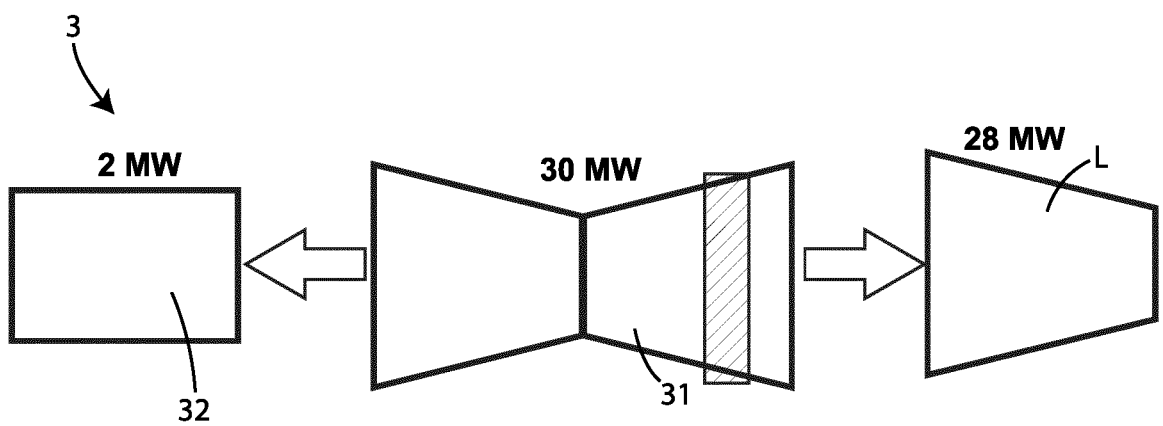
FIG. 7 illustrates a scheme of the operation of the train system of FIG. 5 in the starter/generator mode.

Referring now to FIGS. 6 and 7, two different operation modes of a hybrid gas turbine 2 are shown. More specifically, in FIG. 6 the VFD electric motor 32 is operated as starter/helper mode, where the VFD electric motor 32 supplies (maximum) 2 MW the gas turbine 31, so as to supply the load L with a total amount of (maximum) 32 MW of power.

In FIG. 7, instead, the gas turbine 31 is operated in the starter/generator mode, so that the gas turbine 31 supplies the load L with (maximum) 28 MW and the VFD electric motor 32 with (maximum) 2 MW. The VFD electric motor 32 can be also connected to the power grid (not shown in the figures) so as to inject power into the same.

Both the operation modes are available in the above-mentioned layout. The operation of the hybrid gas turbine system 3 can be operated by the logic control unit 2, selecting the different operating modes, optimizing the operation with respect to the circumstances, namely depending on any layout of hybrid gas turbine 3.

In particular, how the processor 21 (or processing means in general) processes the various vectors and variables of each, depends, in part, on the requirement of the load L and the constraints received to maximize some of the optimization variables $y_j$, so as to maximize either operating performance of the hybrid gas turbine system 3 or the cost of the power to be supplied.

Figure 8:
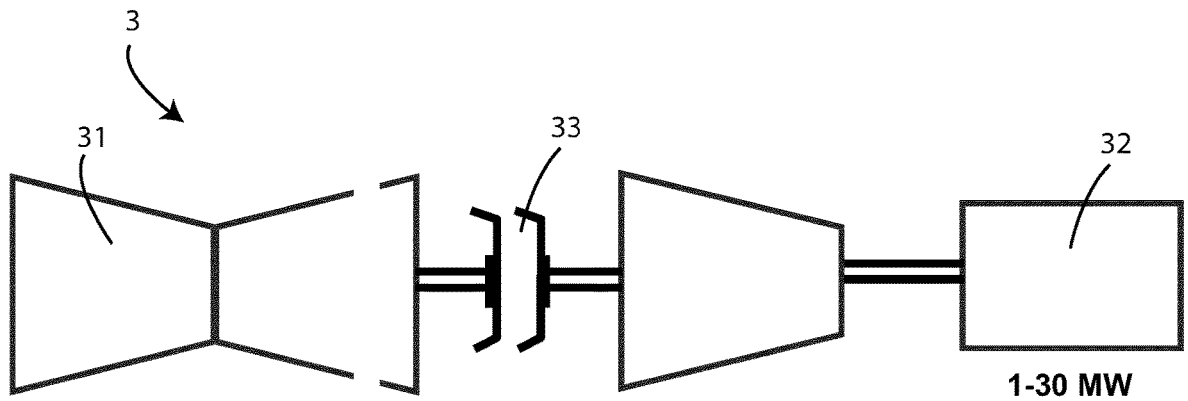
FIG. 8 illustrates a second embodiment of a train system.

Referring now to FIG. 8, another layout of a train system is shown, where the load L is connected to a 30 MW gas turbine 31 through a disconnecting device 33, and a 30 MW VFD electric motor 32 is connected to the load L as well.

In general the disconnecting devices 33 installed in the train systems are clutches, of self-synchronizing clutch or over running types. Such clutches are equipped with devices known as lock-in and lock-out devices, which, when activated, have the function of locking the clutch in an engaged or disengaged position.

Figure 9:
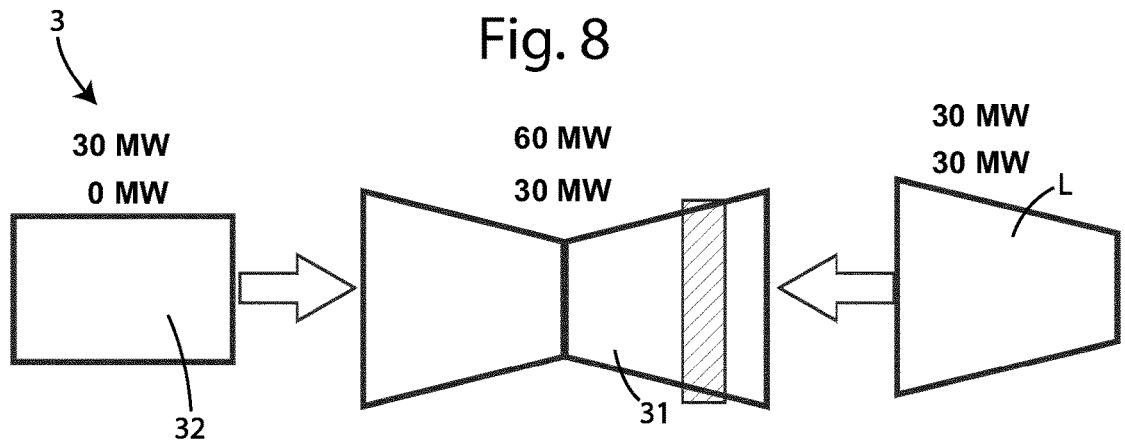
FIG. 9 illustrates a scheme of the operation of the train system of FIG. 8 in the helper/full electric mode.

FIG. 9 illustrates the operation of the hybrid gas turbine 3 in helper mode, when both the gas turbine 31 as well as the VFD electric motor 32 generate the maximum power to the load L, which in this case is (maximum) 60 MW (namely, the sum of the maximum power, for example, generated by the gas turbine 31 and the VFD electric motor 32; or in full electric mode, where the gas turbine 31 is shut down and the VFD electric motor 32 supplies the load L, with a (maximum) power of 30 MW. In this case the disconnecting device 33 is disconnected.

Figure 10:
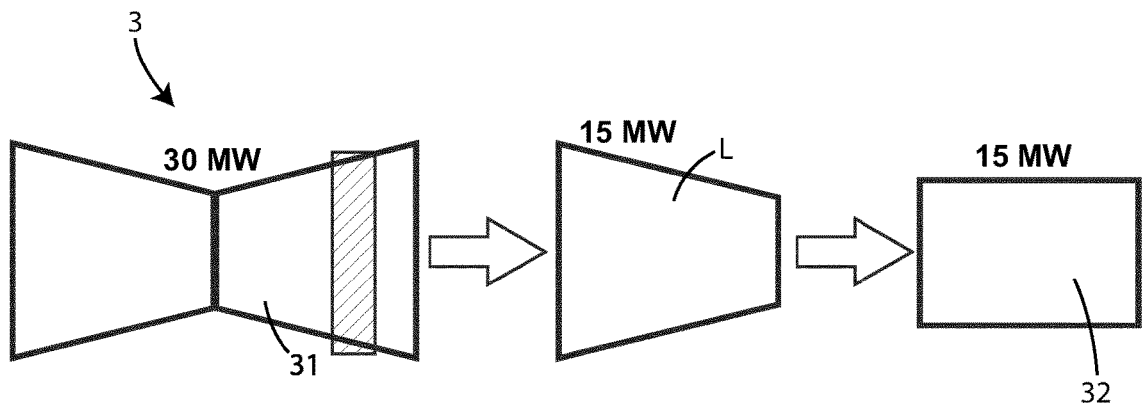
FIG. 10 illustrates a scheme of the operation of the train system of FIG. 5 in the generator mode.

FIG. 10 depicts the hybrid gas turbine system 3 operating in generator mode, where the gas turbine 31 is able to generate, for instance, (maximum) 30 MW power, part of which (for example 50% of the maximum power generated by the gas turbine 31, namely 15 MW) is absorbed by the load L, and the residual 50% of the power generated, always 15 MW is absorbed by the VFD electric motor 32, and thus injected in the power grid (not shown) the VFD electric motor 32 is connected to.

As it can be appreciated, the appropriate adjustment of the power to be generated by the gas turbine 31 or absorbed by the VFD electric motor 32 and/or to be absorbed by the load L (a pump, a compressor or the like) and the VFD electric motor 32, in the different operating mode, is a matter or proper optimization, depending on the several variables or groups of data 41, 42, and 43 briefly listed above.

In addition, the monitoring and controlling method, based on the algorithm described above, is flexible, as it can adapt to different layouts. Just by way of example, referring to the state variables x, the state variable "clutch feedback", will be not used in the hybrid gas turbine system 3 shown in FIG. 5, while it is used in in the layout of the hybrid gas turbine system 3 of FIG. 8 or the layout provided with two clutches. Therefore, by the right selection of the control functions $f_i(x, u, w)$, by way of setting of the appropriate values of the weight parameters $\alpha_i$, it possible to realize any possible layout of hybrid gas turbine system 3.

As said, in addition to the layouts shown in FIGS. 5, 6, 7, 8, 9 and 10, other layouts can be foreseen. More specifically, other embodiments can include a hybrid gas turbine system 3 similar to that shown in FIG. 8, where an additional clutch is interposed between the load L and the electric motor/generator 32. In particular, a possible layout would provide a gas turbine, an electric motor/generator 32, between which a first clutch is interposed, a load, and a second clutch, interposed between the a electric motor/generator 32 and the load L.

Figure 11:
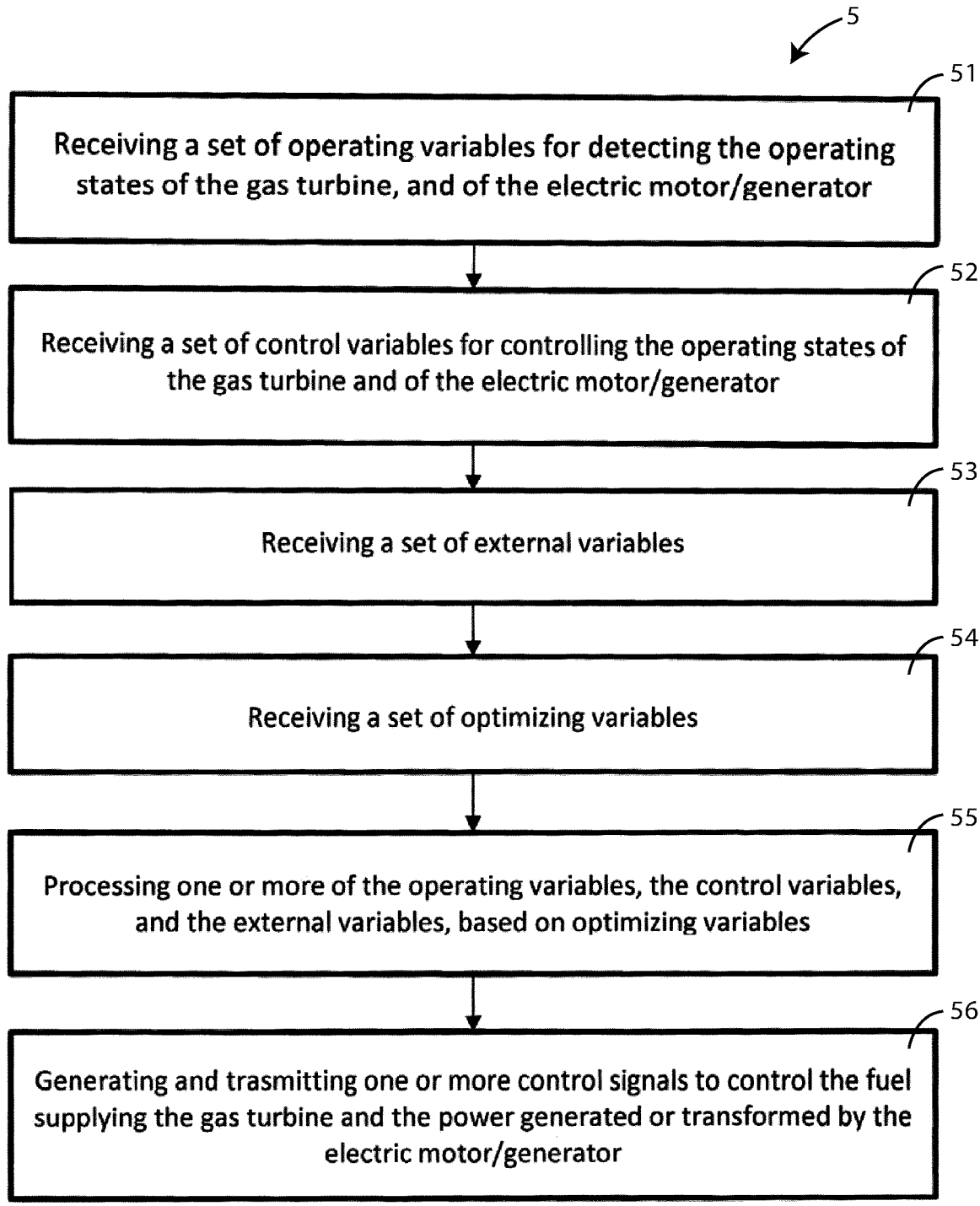
FIG. 11 illustrates a flowchart of the method for monitoring and controlling a hybrid gas turbine system.

The monitoring and controlling method 5 herein disclosed can be also appreciated looking at the flowchart of FIG. 11, showing the following steps:
- receiving 51 the operating variables x, for detecting the operating states of the gas turbine 31, and of the electric motor/generator 32;
- receiving 52 the control variables u, for controlling the operating states of the gas turbine 31 and of the electric motor/generator 32;
- receiving 53 a set of external variables w;
- receiving 54 a set of optimizing variables y. The values of the optimizing variables y depend on the operating variables x, the control variables u, and the external variables w. Also, the values of the optimizing variables y have to be adjusted for being optimized;

processing 55 one or more of the operating variables x, the control variables u, and the external variables w, by optimizing the values of the optimizing variables y; and generating and transmitting 56 one or more control signals based on the control variables u as obtained by the optimization of the optimizing variables y, to control the fuel supplying the gas turbine 31 and the power generated or transformed by the electric motor/generator 32.

These steps may be performed in any suitable order or combination, unless expressly stated otherwise herein.

The electric motor/generator 32 can be connected to a grid energy storage 431, to a solar panel power plant 432, to a wind power plant 433, to a hydrothermal power plant 434, or to a thermal power plant 435, or to any general power grid, into which it is capable of injecting any excess energy.

Also a grid energy storage 431, a solar panel power plant 432, a wind power plant 433, a hydrothermal power plant 434, or a thermal power plant 435 can be operatively connected the control logic unit 2, from which the latter can gather data, such as part of the external variables w.

Figure 12:
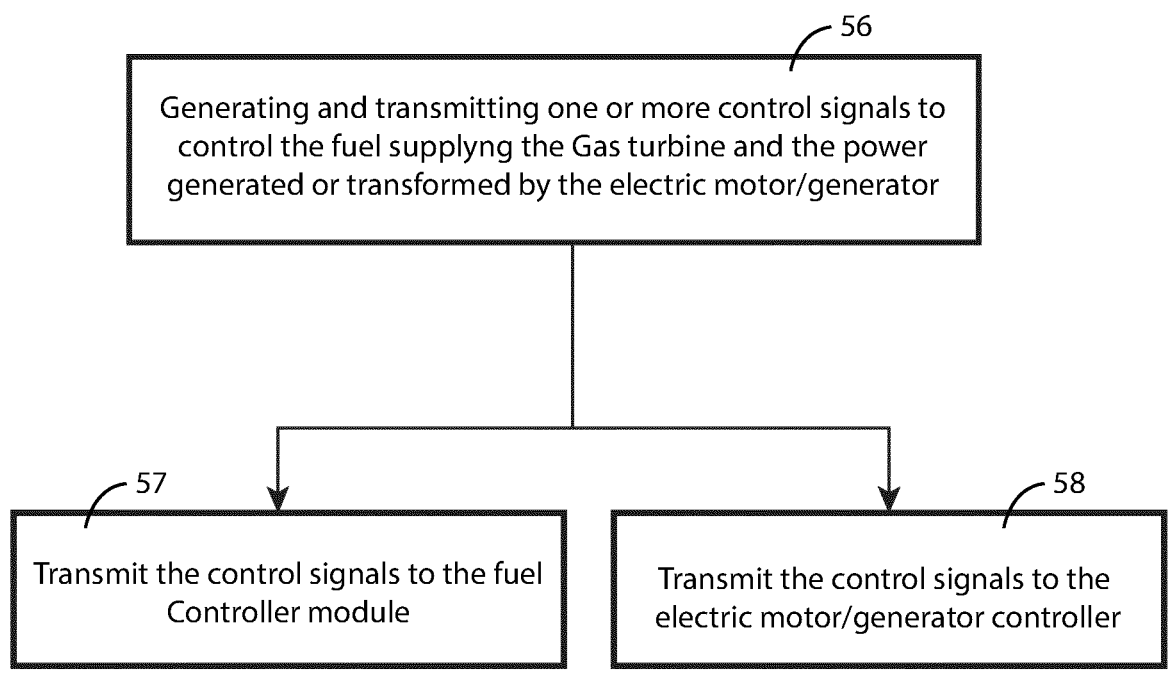
FIG. 12 illustrates a flow chart of the control of a fuel controller module and/or of an electric/motor generator controller.

Referring to FIG. 12, it is in particular illustrated how the control logic unit 2, and in particular the a receiving-transmitting module 25, transmits (step 57) the control signals received by the processor 21 to the fuel controller module 311 of the gas turbine 31, and transmits (step 58) the an electric motor/generator controller 321 of the electric motor/generator 32.

While the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A method for monitoring and controlling a hybrid gas turbine system, the hybrid gas turbine system comprising a gas turbine to be operated by fuel, an electric motor/generator capable of operating as a generator or as a motor, a plurality of actuators configured to control the gas turbine and the electric motor/generator, respectively, and a control logic unit, the method comprising:

receiving a set of state variables x that describe operating states of the gas turbine and the electric motor/generator;

receiving a set of external variables w;

selecting a set of control variables u for controlling the operating states of the gas turbine and the electric motor/generator;

setting a set of optimizing variables $y_i$ and a set of control functions relating the set of optimizing variables $y_i$ to the set of operating variables x, the set of control variables u, and the set of external variables w;

determining an optimized set of control variables u by minimizing a sum of a plurality of norms, each norm being calculated based on a difference between each respective optimizing variable $y_i$ of the set of optimizing variables $y_i$ and a respective control function of the set of control functions associated with the respective optimizing variable $y_i$; and generating and transmitting a control signal based on the optimized set of control variables to control the plurality of actuators.

2. The method of claim 1, wherein the control signal controls fuel supply to the gas turbine and power generated by the electric motor/generator.

3. The method of claim 1, wherein the optimizing variables $y_i$ is a subset of the set of operating variables x, the set of control variables u, or the set of external variables w.

4. The method of claim 1, wherein the optimized set of control variables u accounts for a vector of weights $\alpha_i$.

5. A hybrid gas turbine system comprising:

a gas turbine;

a fuel controller module operable for controlling fuel to be supplied to the gas turbine;

an electric motor/generator capable of operating as a generator or as a motor;

an electric motor/generator controller adapted to control and adjust electric power generated by the electric motor/generator;

a plurality of actuators configured to control the gas turbine and the electric motor/generator, respectively; and a control logic unit operatively connected to the fuel controller module and to the electric motor/generator controller, wherein the control logic unit is configured to:

receive a set of state variables x that describe operating states of the gas turbine and the electric motor/generator;

receive a set of external variables w;

select a set of control variables u for controlling the operating states of the gas turbine and the electric motor/generator;

set a set of optimizing variables $y_i$ and a set of control functions relating the set of optimizing variables $y_i$ to the set of operating variables x, the set of control variables u, and the set of external variables w;

determine an optimized set of control variables u by minimizing a sum of a plurality of norms, each norm being calculated based on a difference between each respective optimizing variable $y_i$ of the set of optimizing variables $y_i$ and a respective control function of the set of control functions associated with the respective optimizing variable $y_i$; and generate and transmit a control signal based on the optimized set of control variables u to control the plurality of actuators.

6. The hybrid gas turbine system of claim 5, wherein a receiving-transmitting module of the control logic unit is configured to transmit the control signals to the fuel controller module of the gas turbine and to the electric motor/generator controller of the electric motor/generator.

7. The hybrid gas turbine system of claim 5, wherein the electric motor/generator is connected to a power generation plant.

8. The hybrid gas turbine system of claim 5, wherein the electric motor/generator is connected to one of a grid energy storage, a solar panel power plant, a wind power plant, a hydrothermal power plant, or a thermal power plant.

9. The hybrid gas turbine system of claim 5, further comprising:

a pump or a compressor connected to the gas turbine.

10. The hybrid gas turbine system of claim 5, further comprising:

a load; and a self-synchronizing clutch or an over running clutch interposed between the load and the gas turbine.

11. The hybrid gas turbine system of claim 10, further comprising:

a load; and a self-synchronizing clutch or an over running clutch interposed between the load and the gas turbine, wherein the self-synchronizing clutch or the over running clutch is operated manually by an operator or automatically by an actuator.

12. The hybrid gas turbine system of claim 5, wherein the electric motor/generator is a variable frequency drive electric motor.

13. The hybrid gas turbine system according to of claim 5, wherein the gas turbine is an aero derivative gas turbine.

14. The hybrid gas turbine system of claim 5, wherein the gas turbine is a heavy duty gas turbine.

* * * * *